United States Patent [19]

Peso

[11] Patent Number: 4,757,305
[45] Date of Patent: Jul. 12, 1988

[54] WATER LEVEL INDICATOR

[76] Inventor: Dominic Peso, Box 433, Mescalero, N. Mex. 88340

[21] Appl. No.: 739

[22] Filed: Jan. 5, 1987

[51] Int. Cl.⁴ ............................................. G08B 21/00
[52] U.S. Cl. .................................... 340/624; 116/110; 116/228; 73/307; 73/319; 200/84 C; 200/84 A
[58] Field of Search ................ 340/623, 624; 116/110, 116/227, 228; 73/305, 307, 308, 319, 322.5, 313; 200/84 R, 84 A

[56] References Cited

U.S. PATENT DOCUMENTS

| | | | |
|---|---|---|---|
| 267,856 | 11/1882 | Fennerty | 73/307 |
| 331,801 | 12/1885 | Logee | 73/307 |
| 465,767 | 12/1891 | St. Clair | 73/308 |
| 1,005,111 | 10/1911 | Fieseler | 73/313 |
| 1,348,015 | 7/1920 | Lee | 340/624 |
| 3,436,727 | 4/1969 | Pagano | 73/308 |
| 3,644,691 | 2/1972 | Suzuki | 73/308 |
| 3,798,595 | 3/1974 | Dyke | 340/624 |
| 3,823,328 | 7/1974 | Barton | 73/308 |
| 3,941,078 | 3/1976 | McCloskey | 73/307 |
| 4,081,638 | 3/1978 | Thorn | 73/308 |
| 4,398,186 | 8/1983 | Statz | 73/308 |
| 4,444,052 | 4/1984 | Reinartz | 73/308 |
| 4,500,761 | 2/1985 | Kuboto | 116/109 |

FOREIGN PATENT DOCUMENTS 2027450 2/1980 United Kingdom ................ 116/110

Primary Examiner—Joseph A. Orsino
Assistant Examiner—Jill D. Jackson
Attorney, Agent, or Firm—W. C. Tupman

[57] ABSTRACT

A water level indicator useful for signalling a plurality of different water levels within a bathtub. The device has clamping means for removably securing the indicator to the tub, a depending float chamber for projecting into the tub and a battery operated sound alarm system. A float and rod assembly are housed within the float chamber. The rod projects through an opening in the top of the indicator and is provided with a plurality of metallic bands which will complete an electrical circuit to sound the alarm.

13 Claims, 2 Drawing Sheets

WATER LEVEL INDICATOR

BACKGROUND OF THE INVENTION

This invention relates to a signal alarm for use when filling a bathtub with water. The device is removably attached to the tub.

In getting ready to take a bath, one will start the water running into the tub and then may become engrossed in some other activity. This may be completely diverse to bathing and may even include watching a television program or answering the telephone. In due course, one may completely forget about the bathtub. This is not usually distastrous, since most tubs are equipped with overflow drains that prevent the water from running over the rim of the tub. Nonetheless, to let the water run continuously into the tub is to waste not only water, but hot water and, therfore, to waste the energy used in heating that hot water and its relacement in the water tank.

It is, therefore, an object of this invention to sound an alarm when the water level in the tub reaches a desired point.

Another object of this invention is to provide a plurality of sound alarms to be actuated at spaced time intervals, whereby a user who wants the tub filled to a higher level will wait for a second alarm before turning off the water.

A further object is to provide a sound alarm that will indicate that the user has completely forgotten about the water flowing into the tub. In this instance, the alarm will sound continuously.

DETAILED DESCRIPTION OF THE INVENTION

Figure 1:
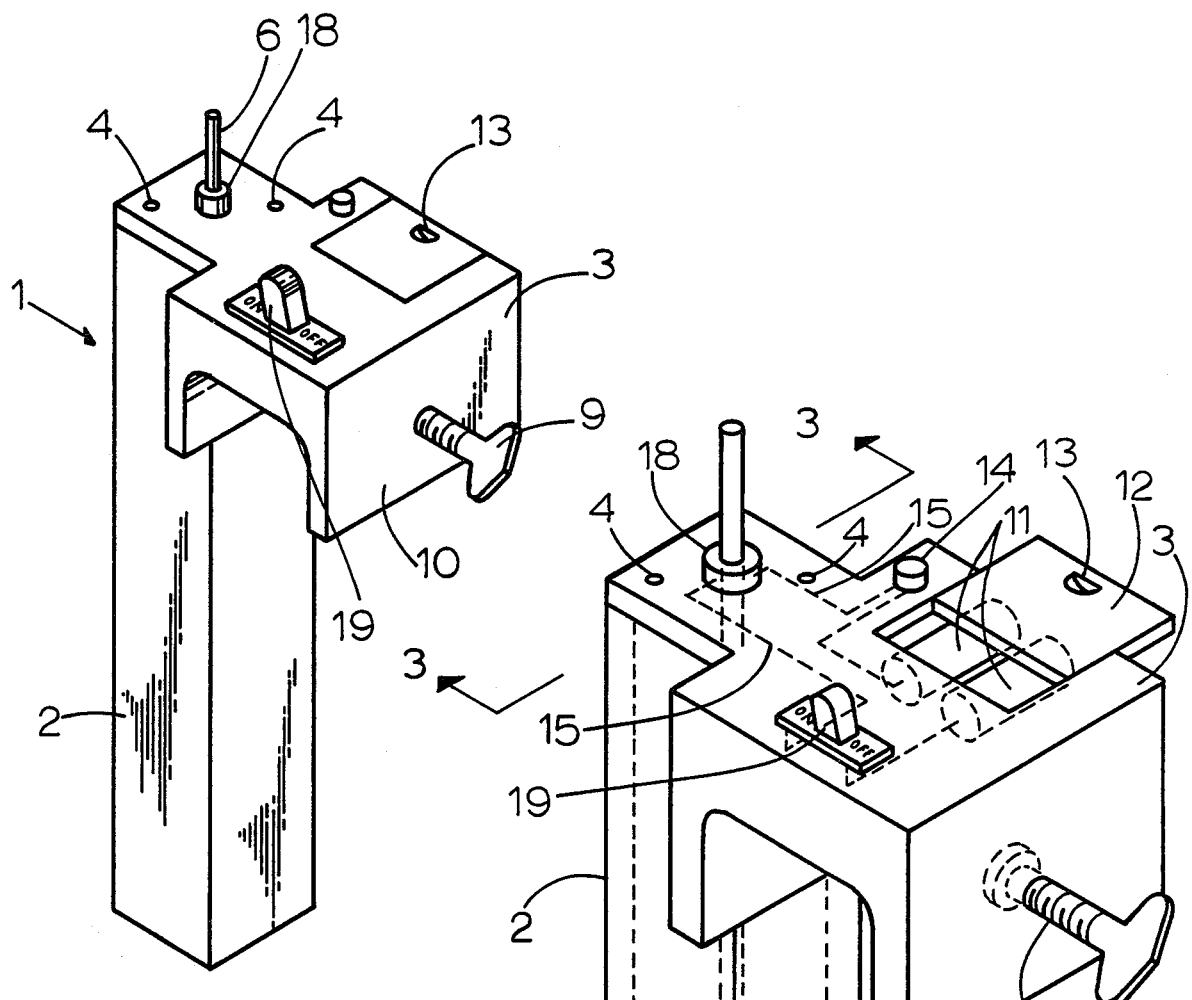
FIG. 1 is a perspective view of my water level indicator.

Referring now to the views of the drawing, it will be noted that the water level indicator 1 comprises an elongated, rectangular member 2 carrying a laterally extending unit 3 at one end. Both the member 2 and the unit 3 are primarily made of a suitable plastic material and are connected together by suitable fasteners 4.

Figure 2:
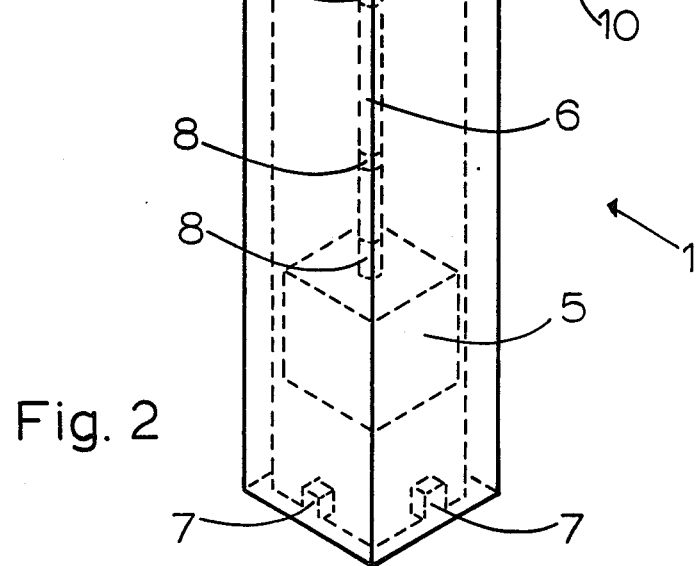
FIG. 2 is a similar perspective view which shows the float, the rod, the batteries and the electrical wiring in phantom lines.

The rectangular member 2 is hollow and is open at each end. As shown in FIG. 2, a float 5 is positioned in the lower portion of the member 2 and is provided with an elongated rod 6 projecting from its upper surface. The rod 6 extends through an opening in the unit 3 and terminates thereabove. Lugs 7 project into the member 2 at the lower end and provide a stop for the downward movement of the float 5. The rod 6 is made mostly of light weight plastic material and may also be hollow. Rod 6 is provided with a plurality of bands 8 which are positioned at selected distances along the length of the rod and are made of an electrically conductive material, such as metal. The rod 6 may be adjustably connected to the float 5 by either a friction fit or by a screw thread arrangement (not shown). This will permit the position of the bands 8 relative to the unit 3 to be adjusted.

Unit 3 is provided with a U-shaped portion located at one side of the member 2 and is adapted to straddle the upper rim of a bathtub. A clamping screw 9 is located in the outer leg 10 and is adapted to adjustably secure the indicator 1 to the rim of a tub.

Figure 3:
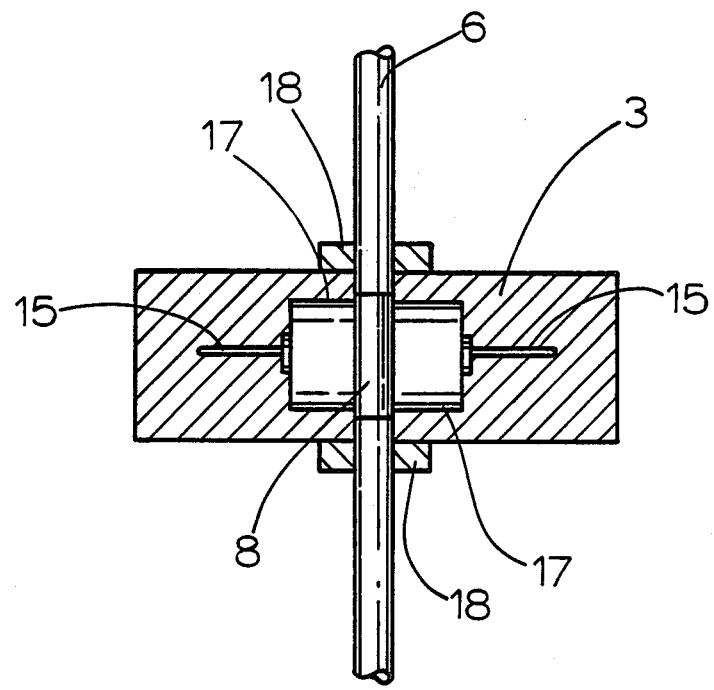
FIG. 3 is a cross-sectional view taken along the line 3—3 of FIG. 2 and shows the rod at a position to complete the electrical circuit.

A compartment for a pair of batteries 11 is provided in the upper portion of the unit 3. A slideable cover 12 closes the compartment and is provided with a finger recess 13 for aiding in moving the cover 12 to an opened position. A suitable sound alarm device 14 is also provided in the unit 3 and may be a buzzer, a bell or the like. An electrical circuit 15 connects the batteries 11 to the alarm 14 and terminates at the opening 16 for receiving the rod 6. The circuit 15 is carried within the plastic unit 3 and as shown in FIG. 3, is provided with electrical terminals 17 at the opening 16. The circuit 15, along with terminals 17, may be encapsulated within the plastic material used in molding the unit 3. Bushings 18 may be provided on the upper and lower surfaces of the unit 3 and give additional stability to the rod 6 while moving through the opening 16.

In operation, the indicator 1 is first placed over and clamped to the rim of a bathtub with the member 2 depending into the tub. The water is turned on and, as the tub is filled, water enters the lower end of the member 2. Continued filling of the tub will cause the float 5 and the rod 6 to rise within the member 2. When the first metal band 8 reaches the terminals 17 in the opening 16, the electrical circuit is closed and the alarm 14 goes off, thus indicating that the water within the tub has reached a certain level.

If the water is not turned off, the float 5 and the rod 6 will continue to move up within the member 2. The initial alarm will automatically be turned off once the first metallic band 8 ceases to make contact with the terminals 17, thus opening the electrical circuit. Further filling will raise the rod 6 to a point wherein the next band 8 makes contact with the terminals 17, wherein the alarm will sound a second time. The rod 6 and float 5 may be adjusted so that this second band 8 occupies a position for the highest desired water level within the tub. The lowest band 8 is wider than the other two bands. This added width will allow a wide range of adjustments between the rod 6 and the float 5 while still permitting contact with the terminals 17 when the float is at its highest point and in engagement with the lower bushing 18. At this point, the alarm will sound continuously and the user will know that the water should be turned off.

Switch 19 is positioned within the electrical circuit to provide a manual control of the alarm. Once the bathtub is filled and the alarm is continuously sounding, the user may at this point turn off the alarm by means of the switch 19. The indicator may therefore be permanently positioned upon the rim of the bathtub.

While the indicator 1 has been described as being useful in a bathtub, it should be understood that the indicator may be used in other places, such as a kitchen sink or a laundry tub. Also, the indicator 1 may be used in other completely diverse areas such as a sump pit, a cistern, a reservoir or even in the bilge of a boat.

Since various changes may be made in the construction of this water level indicator without departing from the scope of my invention, it is intended that all matter contained in the foregoing description and shown in the accompanying drawing shall be interpreted as illustrative only.

I claim:

1. A water level indicator useful in a bathtub or the like comprising a wall member carrying means to fasten the indicator to a tub, an elongated float chamber depending from the wall, a float within the chamber, a rod secured to said float and slideably projecting through an opening in said wall, an alarm and a battery compartment associated with said wall, an electrical circuit interconnecting the alarm and the battery compartment and being provided with terminals at spaced locations about said opening, an inner surface of each terminal defining a portion of said opening, said terminals being electrically insulated from each other and forming a part of said wall, said rod being provided with an electrically conductive band along a relatively short portion of its length, the exposed surface of said rod other than at said band being non-conductive, said rod having a substantially uniform diameter throughout its length including both the electrically conductive band portion and the non-conductive portion thereof, said rod having a diameter corresponding very closely with that of said opening, so that as the tub is filled with water, the float and the rod will rise within said chamber and when the band reaches the level of the terminals, the electrical circuit will be closed and the alarm will sound.

2. The indicator of claim 1, wherein said electrically conductive band is metallic.

3. The indicator of claim 1, wherein said rod is provided with a plurality of bands which are spaced from each other along the length of the rod.

4. The indicator of claim 3, wherein at least one of said plurality of bands is located adjacent the float.

5. The indicator of claim 3, wherein at least a pair of said plurality of bands are located in spaced relationship to said float.

6. The indicator of claim 5, wherein at least one of said plurality of bands is located adjacent the float.

7. The indicator of claim 1, wherein the rod is adjustably connected to the float.

8. The indicator of claim 1, wherein the battery compartment is located within said wall member and is provided with a sliding cover.

9. The indicator of claim 1, wherein the electrical circuit is embedded within said wall member.

10. The indicator of claim 1, wherein said wall member is provided with a bushing adjacent said opening for receiving said rod therethrough.

11. The indicator of claim 10, wherein each surface of said wall member carries one of said bushings.

12. The indicator of claim 1, wherein said float chamber is provided with a plurality of inwardly projecting lugs at its lower end.

13. The indicator of claim 1, wherein said electrical circuit is provided with an on-off switch.

* * * * *